United States Patent [19]
Fujita

[11] Patent Number: 5,222,055
[45] Date of Patent: Jun. 22, 1993

[54] OPTICAL HEAD

[75] Inventor: Shuichi Fujita, Amagasaki, Japan

[73] Assignee: Mitsubishi Denki Kabushiki Kaisha, Japan

[21] Appl. No.: 714,677

[22] Filed: Jun. 13, 1991

[30] Foreign Application Priority Data

Jun. 15, 1990 [JP] Japan .................. 2-155362

[51] Int. Cl.$^5$ .............................................. G11B 7/00
[52] U.S. Cl. .................. 369/44.32; 369/44.37; 369/44.41
[58] Field of Search .............. 369/44.37, 44.38, 44.39, 369/44.41, 44.23, 110, 44.32, 44.11; 250/201.5

[56] References Cited

U.S. PATENT DOCUMENTS

| 4,425,636 | 1/1984 | Musha et al. ............... 369/44.37 |
| 4,546,463 | 10/1985 | Opheij et al. ............... 369/110 |
| 4,775,968 | 10/1988 | Ohsato ............... 369/44.37 |
| 4,841,514 | 6/1989 | Tsuboi et al. ............... 369/44.37 |
| 4,875,203 | 10/1989 | Takamura et al. ............... 369/44.37 |
| 5,033,040 | 7/1991 | Fujita ............... 369/44.37 |

FOREIGN PATENT DOCUMENTS

| 62-68322 | 10/1986 | Japan . |
| 62-20149 | 1/1987 | Japan ............... 369/44.23 |
| 62-109242 | 5/1987 | Japan ............... 369/44.23 |
| 62-121936 | 6/1987 | Japan ............... 369/44.37 |
| 62-164232 | 7/1987 | Japan ............... 369/44.38 |
| 2-143930 | 6/1990 | Japan ............... 369/44.37 |

OTHER PUBLICATIONS

U.S. patent Application Ser. No. 07/619758 (submitted by applicant).

Primary Examiner—Tommy P. Chin
Assistant Examiner—Thai Tran
Attorney, Agent, or Firm—Wolf, Greenfield & Sacks

[57] ABSTRACT

An optical head which detects the tracking error by irradiating the light beam onto data medium and detecting the reflected light therefrom, is provided with a light source generating a first light beam for detecting the tracking error signal and a second light beam whose distribution of the amount of the reflected beam from the data medium in its reflecting direction is not effected by the occurrence of the tracking error. The optical head irradiates both the light beams on the data medium, guides the reflected light of each light beam in different directions, detects the tracking error signal temporarily by the first light beam, detects the offset corresponding to the displacement of an objective lens by the second light beam, and cancels an offset being included in the temporarily detected tracking error signal by that detected offset.

12 Claims, 5 Drawing Sheets 8a　　8b 5a　　5b

OPTICAL HEAD

BACKGROUND OF THE INVENTION

1. Field of the Invention

This invention relates to an optical head which writes/reads information optically to/from a data medium.

2. Description of Related Art

FIG. 1 is a conventional optical head disclosed, for example, in Japanese Utility Model Application Laid-Open No. 61-68322 (1986). In the figure, a light beam emanated from a semi-conductor laser 1 is deflected by a half mirror 2. In the direction the emanated light is to be deflected, an objective lens 3 is disposed, and at the far side of the objective lens 3, a data medium 4 is disposed. On the data medium 4, a guiding groove 4a is provided along each track where information being is written/read thereto or therefrom.

A 2-divided photodetector 5 having two light-receiving elements is disposed across the half mirror 2 from the objective lens 3. The 2-divided photodetector 5 is connected to a differential amplifier 6. The differential amplifier subtracts the output of the one light-receiving element 5a from the output of the other light-receiving element 5b.

In the optical head as mentioned above, a light beam emanated from the semi-conductor laser 1 is sidewardly deflected at 90° by the half mirror 2. The deflected light is projected on the data medium 4 through the objective lens 3. In the case where the projected light focuses on the data medium 4, a minute light spot of about 1 μm in diameter is formed on the data medium 4. The reflected light from the data medium 4 is projected on the 2-divided photodetector 5 through the objective lens 3 and half mirror 2. The 2-divided photodetector 5 outputs to the differential amplifier 6 an electric signal corresponding to the amount distribution of the light incident upon the two light-receiving elements 5a, 5b. The differential amplifier 6 detects the tracking error of the minute light spot against the data medium 4 on the basis of the amount distribution of the light incident upon the two light-receiving element 5a, 5b.

The tracking servo is carried out by driving the objective lens 3 in the radial direction of the data medium 4 (direction T in the figure) on the basis of the detected tracking error signal. On the other hand, the focusing error of the minute light spot against the data medium 4 is detected by a focus error detecting system (not shown). The focusing servo is carried out by driving the objective lens 3 in the vertical direction to the radial direction of the data medium 4 (direction F in the figure) on the basis of the detected focusing error signal.

Next, explanation will be given on the principle of detecting the tracking error. On the left sides of FIG. 2(a), (b), (c), (d) are shown partial plane views of the data medium 4, and on the right side partial views of optical paths. As shown in FIG. 2(a), (c), in the case where the minute light spot is at the center of the guiding groove 4a or at the center between the guiding grooves 4a on the data medium 4, that is, the writable/readable position of information, the light amounts being incident upon the two light-receiving elements 5a, 5b are equal.

On the other hand, as shown in FIG. 2(b), (d), in the case where the minute light spot is crossing the guiding groove 4a, the light irradiated on the guiding groove 4a is diffracted, and the amount of the light being incident upon the one light-receiving element 5a or 5b (oblique line portion) becomes less than that being incident upon the other light-receiving element 5b or 5a. Accordingly, by detecting the difference between the outputs of the two light-receiving elements 5a, 5b, it can be detected whether the minute light spot is adjusted to the guiding groove 4a or not and to which side the spot deviates. This is the tracking error detecting method to be called the diffracted light method or push-pull method.

But in the conventional optical head as mentioned above, at the time of the tracking servo, when the objective lens 3 is displaced in the tracking direction (direction T in FIG. 1) as shown in FIG. 3 by the broken line, the light being incident upon the 2-divided photodetector 5 moves. Accordingly, there is a problem that the tracking servo cannot be carried out correctly because the detected tracking error signal includes the offset.

SUMMARY OF THE INVENTION

This invention has been devised in order to solve the problem as mentioned above.

The primary object of the invention is to provide an optical head which cancels the offset included in the tracking error signal by providing a light beam not being effected by the tracking error other than a light beam for detecting the tracking error, thereby detecting the offset in the tracking direction of the objective lens.

The above and further objects and features of the invention will more fully be apparent from the following detailed description with accompanying drawings.

DESCRIPTION OF THE PREFERRED EMBODIMENTS

In the following, explanation will be given on the optical head of the invention referring to drawings thereof.

Figure 1:
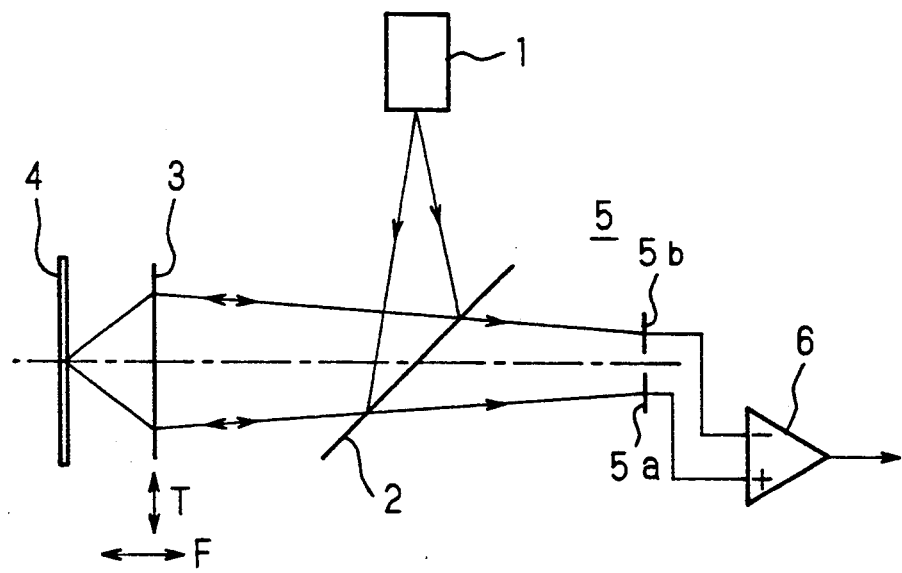
FIG. 1 is a schematic view showing the construction of a conventional optical head and optical path of the tracking servo.
Figure 2A:
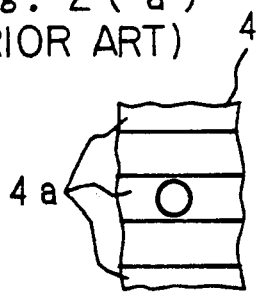
FIG. 2 is a schematic view explanatory of the principle of the tracking servo according to the conventional optical head.
Figure 2A:
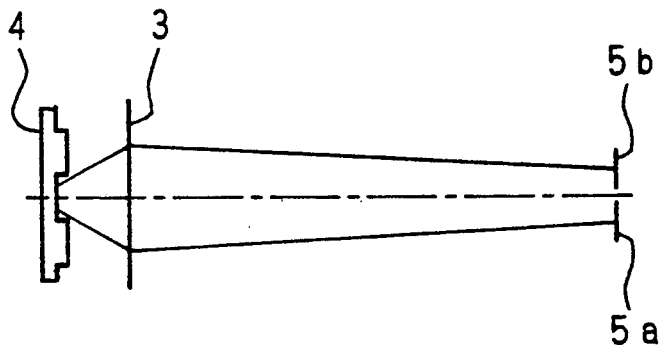
Figure 2B:
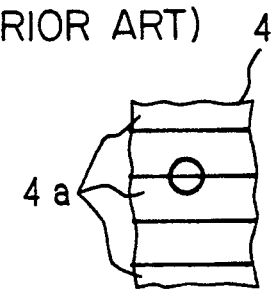
Figure 2B:
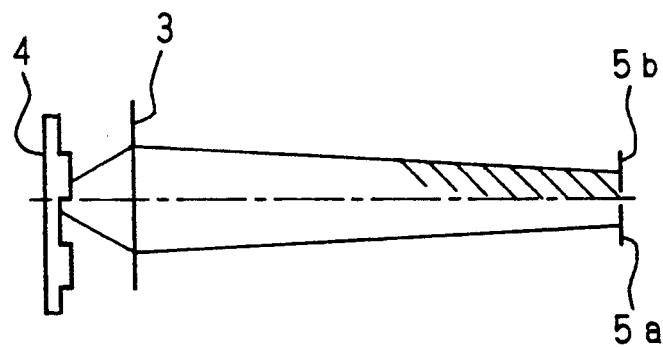
Figure 2C:
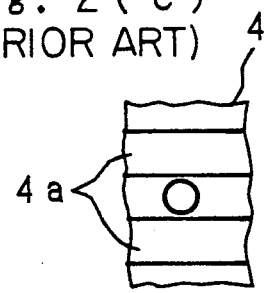
Figure 2C:
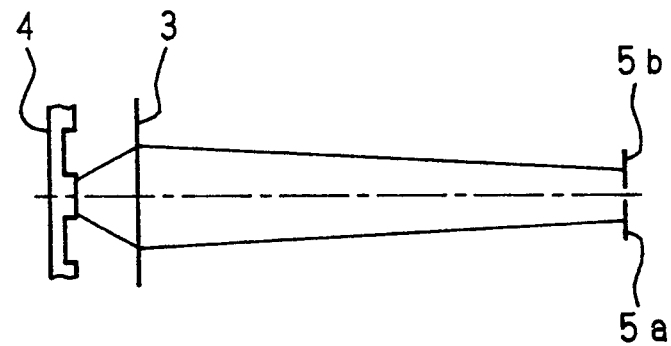
Figure 2D:
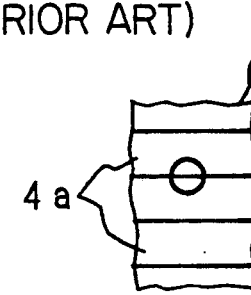
Figure 2D:
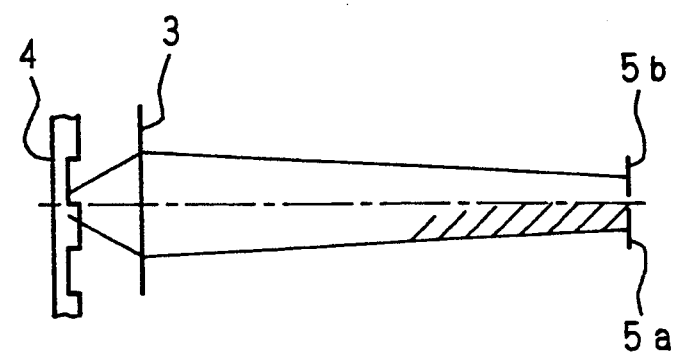
Figure 3:
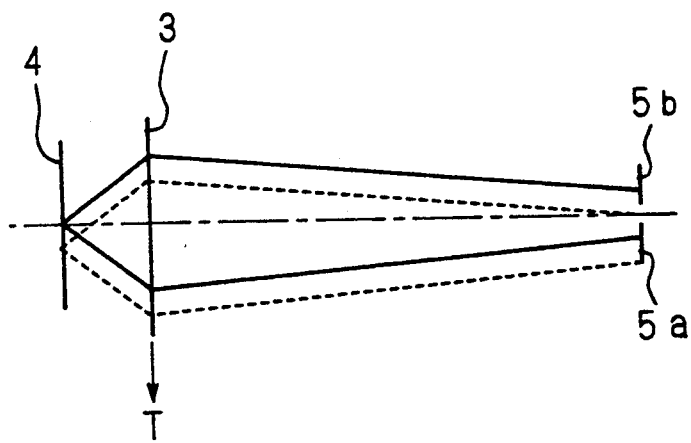
FIG. 3 is a schematic view showing a state of an offset generating in the conventional optical head.
Figure 4:
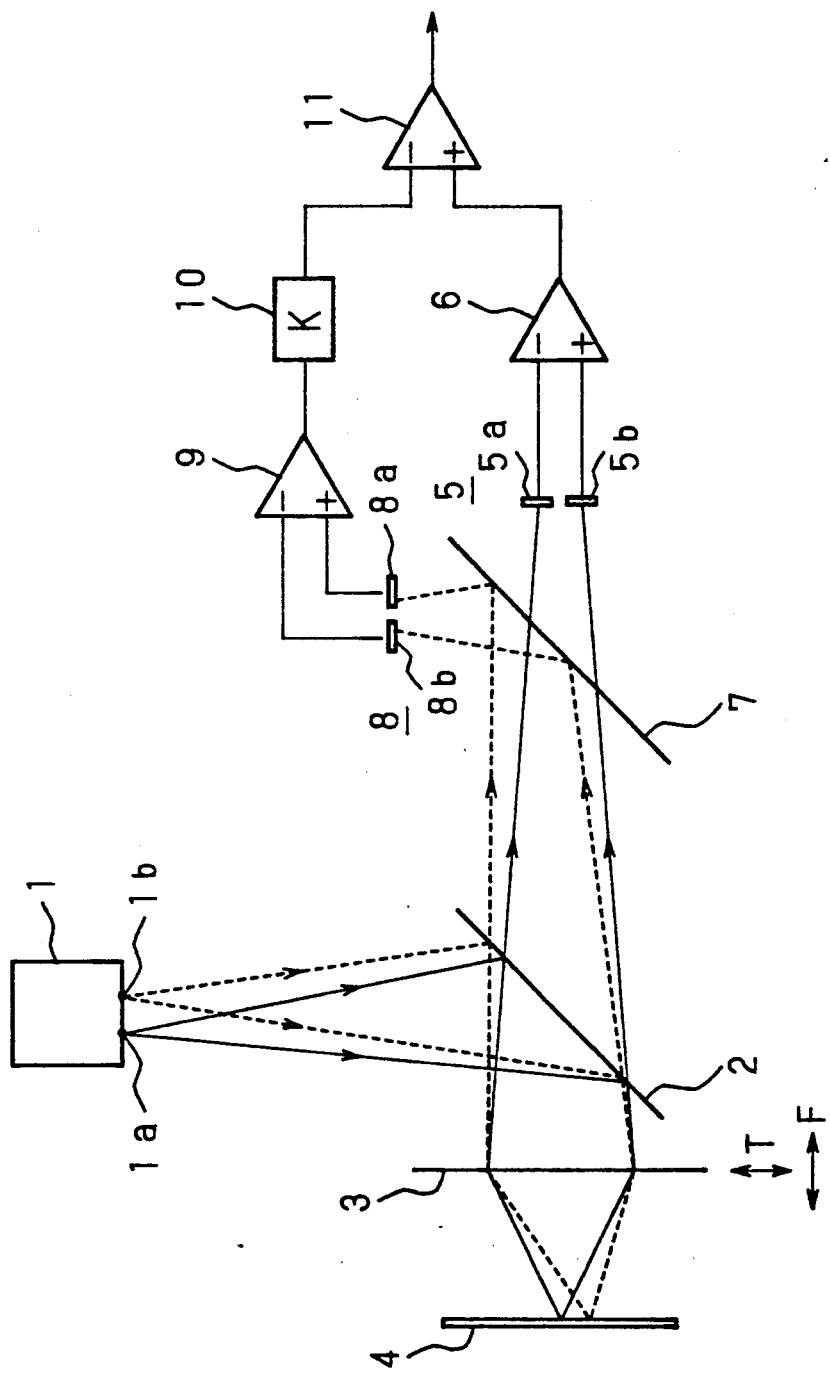
FIG. 4 is a schematic view showing the construction of an optical head of the invention and optical path of the tracking servo.

FIG. 4 is a schematic view showing the construction of an optical head of the invention and the optical path of the tracking servo. In the figure, a semi-conductor laser 1 is a 2-beam array type semi-conductor laser having two light sources 1a, 1b emanating light beams of oscillation wavelengths $\lambda_1$, $\lambda_2$ being different from each other. The light beam of wavelength $\lambda_1$ is used for writing/reading information and for tracking servo/focusing servo. The light beam of wavelength $\lambda_2$ is used for detecting an offset due to displacement of the objective lens 3.

A half mirror 2 deflects the light emanated from the semi-conductor 1. In the direction where the emanated light is deflected, an objective lens 3 is disposed. At the far side of the objective lens 3, a data medium 4 is disposed. On the data medium 4, a guiding groove 4a is provided along each where information being is written/read thereto or therefrom. A dichroic mirror 7 which transmits the light of wavelength $\lambda_1$ while reflects reflecting the light of wavelength $\lambda_2$ is disposed across the half mirror 2 from the objective lens 3.

In the traveling direction of the light transmitted by the dichroic mirror 7, a 2-divided photodetector 5 having two light-receiving elements 5a, 5b is disposed. The 2-divided photodetector 5 is connected to a first differential amplifier 6, and the first differential amplifier 6 subtracts the output of the one light receiving element 5b from the output of the other light receiving element 5a.

In the traveling of the reflected light from the dichroic mirror 7, a 2-divided photodetector 8 having two light-receiving elements 8a, 8b is disposed. The 2-divided photodetector 8 is connected to a second differential amplifier 9, and the second differential amplifier 9 is connected to a direct current amplifier 10. The direct current amplifier 10 is connected to a third differential amplifier 11 together with the first differential amplifier 6.

By the way, in the case where a beam spot irradiated onto the data medium 4 crosses a guiding groove 4a, degree of asymmetry of the distribution of the light amount in the traveling direction of the diffracted light at the guiding groove 4a of the data medium 4 depends upon the depth of the guiding groove 4a. Accordingly, in order to detect the tracking error easily, the depth of the guiding groove 4a is so determined as to make degree of asymmetry of the reflected light beam for detecting the tracking error larger.

The wavelength $\lambda_2$ is so determined that the distribution of the light amount in the traveling direction of the reflected light becomes symmetric even when the tracking error occurs, thereby preventing the reflected beam from being affected by the tracking error.

That is, when L is taken as the depth of the guiding groove 4a, and n as the index of refraction of the surface of the data medium 4, the wavelengths of the laser beam $\lambda_1$, $\lambda_2$ are so determined as to satisfy the following equations.

$\lambda_1 = 4 \cdot n \cdot L/(i - \frac{1}{2})$ i: natural number $\lambda_2 = 4 \cdot n \cdot L/j$ j: natural number In the following, explanation will be given on the operation of the tracking servo by the optical head having the above-mentioned construction. As the method of detecting the tracking error signal by the laser beam of wave-length $\lambda_1$ is the same as that of the conventional one, explanation thereof is omitted.

Figure 5A:
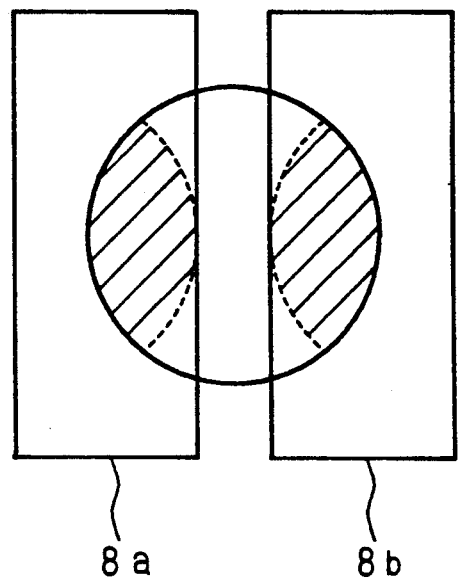
FIGS. 5(a) to 5(b) are schematic view showing the distribution of the light amount of the 2-divided photodetector in the optical head of the invention.
Figure 5B:
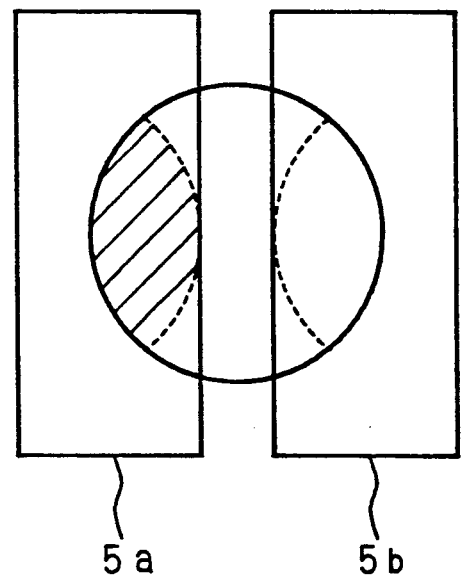

The light beam of wavelength $\lambda_2$ is reflected by the data medium 4 and also by the dichroic mirror 7, then is incident upon the 2-divided photodetector 8. FIGS. 5(a) to 5(b) are schematic view showing the light intensity distribution on the light-receiving elements 5a, 5b and 8a, 8b of 2-divided photodetector 5, 8. In the case where the objective lens 3 does not deviate, each amount of the light being incident upon the two light-receiving elements 8a, 8b of the 2-divided photodetector 8 is always equal in spite of the shift of the minute light spot on the data medium 4, so that the output of the second differential amplifier 9 is always "0" whether the tracking error occurs or not.

In the case where the objective lens 3 deviates in the tracking direction, as the position where the light being incident upon the 2-divided photodetector 5 moves, the tracking error signal detected by the first differential amplifier 6 includes an offset corresponding to the deviation amount of the objective lens. As the amount distribution of the light being incident upon the two light-receiving elements 8a, 8b of the 2-divided photodetector 8 corresponds to the deviation amount of the objective lens 3, only the amount of the offset caused by the displacement of the objective lens 3 is detected. The direct current amplifier 10 compensates the difference in the amount between the lights being incident upon the 2-divided photodetectors 8, 5 and difference in sensitivity between the both photodetectors.

When the third differential amplifier 11 subtracts the output of the second differential amplifier 9 from that of the first differential amplifier 6, the tracking error signal without the offset due to the displacement of the objective lens 3 is obtained.

In addition, in the above embodiment, the 2-beam array type semi-conductor laser is used as the light source, however, the light source is not limited thereto and a multimode laser which oscillates beams with two kinds of wavelengths simultaneously or an SHG (Second Harmonic Generation) laser may be used.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An optical head which irradiates light beams on a data medium and detects a tracking error based on an amount of reflected light from said data medium, comprising:

a light source which irradiates a first light beam whose distribution of reflected light from said data medium in a traveling direction of the reflected light becomes asymmetrical due to the tracking error, and a second light beam whose distribution of reflected light is symmetrical enven when the tracking error occurs;

a condenser lens which condenses the light beams from said light source on the data medium;

optical means for quiding the reflected light of the second light beam from said data medium toward a direction different from that of the reflected light of the first light beam from said data medium;

a first photodetector which detects the amount of the reflected light of the first light beam by at least two light-receiving elements;

means for outputting a temporary tracking error signal on the basis of the detected reflected light by said first photodetector;

a second photodetector which detects the amount of the reflected light of the second light beam by at least two light-receiving elements;

means for outputting an offset signal corresponding to a displacement amount of said condenser lens based on the detected reflected light by said second photodetector; and means for compensating said temporary tracking error signal by said offset signal.

2. An optical head as set forth in claim 1, wherein said light source has light beam supply means for supplying plural light beams different in wavelength from each other.

3. An optical head as set forth in claim 1, wherein said light source is a 2-beam array type semi-conductor laser that outputs said first and second light beams simultaneously.

4. An optical head as set forth in claim 1, wherein said light source is a second harmonic generation laser.

5. An optical head as set forth in claim 1, wherein said optical means is a dichroic mirror.

6. An optical head as set forth in claim 1 wherein the data medium has an index of refraction N, the data medium further includes guiding grooves each having a depth D, and R represents a natural number, said second light beam having a wavelength W wherein:

$$W = (4 \times N \times D)/R.$$

7. An optical head as set forth in claim 6 wherein S represents a natural number, said first light beam having a wavelength Y wherein:

$$Y = (4 \times N \times D)/(S - \tfrac{1}{2}).$$

8. An optical head as set forth in claim 1 wherein said condenser lens simultaneously condenses the first and second light beams on substantially the same area of the data medium.

9. An optical head which irradiates light beams on a data medium and detects a tracking error based on an amount of reflected light from said data medium, comprising:
    means for irradiating a first light beam whose distribution of reflected light from the data medium in a traveling direction of the reflected light is asymmetrical when a tracking error occurs;
    means for irradiating a second light beam whose distribution of reflected light from the data medium in a traveling direction of the reflected light is symmetrical even when a tracking error occurs;
    means for condensing the first and second light beams on the data medium;
    a first photodetector which detects the amount of the reflected light of the first light beam;
    means for outputting a temporary tracking error signal on the basis of the detected reflected light by said first photodetector;
    a second photodetector which detects the amount of the reflected light of the second light beam;
    means for outputting an offset signal based on the detected reflected light by said second photodetector; and
    means for compensating said temporary tracking error signal by said offset signal to generate a tracking error signal.

10. An optical head as set forth in claim 9 wherein the data medium has an index of refraction N, the data medium further includes guiding grooves each having a depth D, and R represents a natural number, said second lighe beam having a wavelength W wherein:

$$W = (4 \times N \times D)/R.$$

11. An optical head as set forth in claim 10 wherein S represents a natural number, said first light beam having a wavelength Y wherein:

$$Y = (4 \times N \times D)/(S - \tfrac{1}{2}).$$

12. An optical head as set forth in claim 9 wherein said means for condensing the first and second light beams on the data medium includes means for simultaneously positioning the first and second light beams on substantially the same area of the data medium.

* * * * *